US009098797B2

(12) United States Patent
Yamano

(10) Patent No.: US 9,098,797 B2
(45) Date of Patent: Aug. 4, 2015

(54) IMAGE FORMING APPARATUS, METHOD FOR CONTROLLING THE SAME, AND PROGRAM

(71) Applicant: CANON KABUSHIKI KAISHA, Tokyo (JP)

(72) Inventor: Mikio Yamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/301,990

(22) Filed: Jun. 11, 2014

(65) Prior Publication Data

US 2014/0368855 A1 Dec. 18, 2014

(30) Foreign Application Priority Data

Jun. 14, 2013 (JP) ................................. 2013-125440

(51) Int. Cl.
G06F 1/26 (2006.01)
G03G 15/00 (2006.01)
G06K 15/00 (2006.01)
G06F 3/12 (2006.01)

(52) U.S. Cl.
CPC .............. *G06K 15/406* (2013.01); *G03G 15/50* (2013.01); *G06F 1/26* (2013.01); *G06K 15/408* (2013.01)

(58) Field of Classification Search
CPC .......... H04N 1/32609; H04N 1/32625; H04N 1/3263; H04N 1/326935; G06K 9/00362; G06K 9/00369; G06K 15/4055; G03G 15/5004; G06F 1/3215; G06F 1/3231; G06F 1/3284; Y02B 60/1267; Y02B 60/1282; Y02B 60/1289
USPC ................. 358/1.11–1.18, 1.9, 2.1, 504, 406; 399/8–37, 81, 82; 713/320–324; 367/93
See application file for complete search history.

(56) References Cited

U.S. PATENT DOCUMENTS

| 5,822,077 | A | * | 10/1998 | Sasaki et al. ................... 358/296 |
| 8,261,090 | B1 | * | 9/2012 | Matsuoka ....................... 713/186 |
| 2008/0170258 | A1 | * | 7/2008 | Yamamura .................... 358/1.15 |
| 2012/0127538 | A1 | * | 5/2012 | Mamiya et al. ............... 358/442 |
| 2012/0278640 | A1 | * | 11/2012 | Caglianone .................... 713/323 |
| 2012/0328319 | A1 | * | 12/2012 | Ogata et al. ...................... 399/75 |
| 2013/0073887 | A1 | * | 3/2013 | Miki et al. ..................... 713/323 |
| 2013/0128298 | A1 | * | 5/2013 | Yamada ........................ 358/1.13 |
| 2013/0258424 | A1 | * | 10/2013 | Ono et al. ..................... 358/475 |
| 2014/0157032 | A1 | * | 6/2014 | Yokoyama .................... 713/323 |
| 2014/0160505 | A1 | * | 6/2014 | Tachikawa et al. .......... 358/1.13 |
| 2015/0006927 | A1 | * | 1/2015 | Ono et al. ..................... 713/320 |

FOREIGN PATENT DOCUMENTS

JP 2008-168588 A 7/2008

\* cited by examiner

Primary Examiner — Chad Dickerson
(74) Attorney, Agent, or Firm — Canon U.S.A. Inc., IP Division

(57) ABSTRACT

An image forming apparatus includes a first detection unit that detects an object in a first region, a second detection unit that detects an object in a second region larger than the first region, a control unit that, if the first detection unit detects an object in the first region, shifts the image forming apparatus from a power-saving state to a normal power state, a display unit that displays information indicating a state of the image forming apparatus, and a power control unit that, when the state of the image forming apparatus is an error state, supplies power to the display unit if the second detection unit detects an object in the second region and, when the state of the image forming apparatus is not the error state, supplies power to the display unit if the first detection unit detects an object in the first region.

5 Claims, 15 Drawing Sheets

|  | DETECTION SIGNAL TRANSMISSION SOURCE | SLEEP RECOVERY CONDITION |
|---|---|---|
| NORMAL STATE | SECOND DETECTION SECTION (REFLECTIVE SENSOR) | SECOND DETECTION SECTION (REFLECTIVE SENSOR) DETECTS HUMAN BODY |
| ERROR STATE | FIRST DETECTION SECTION (PYROELECTRIC SENSOR) | FIRST DETECTION SECTION (PYROELECTRIC SENSOR) DETECTS HUMAN BODY |

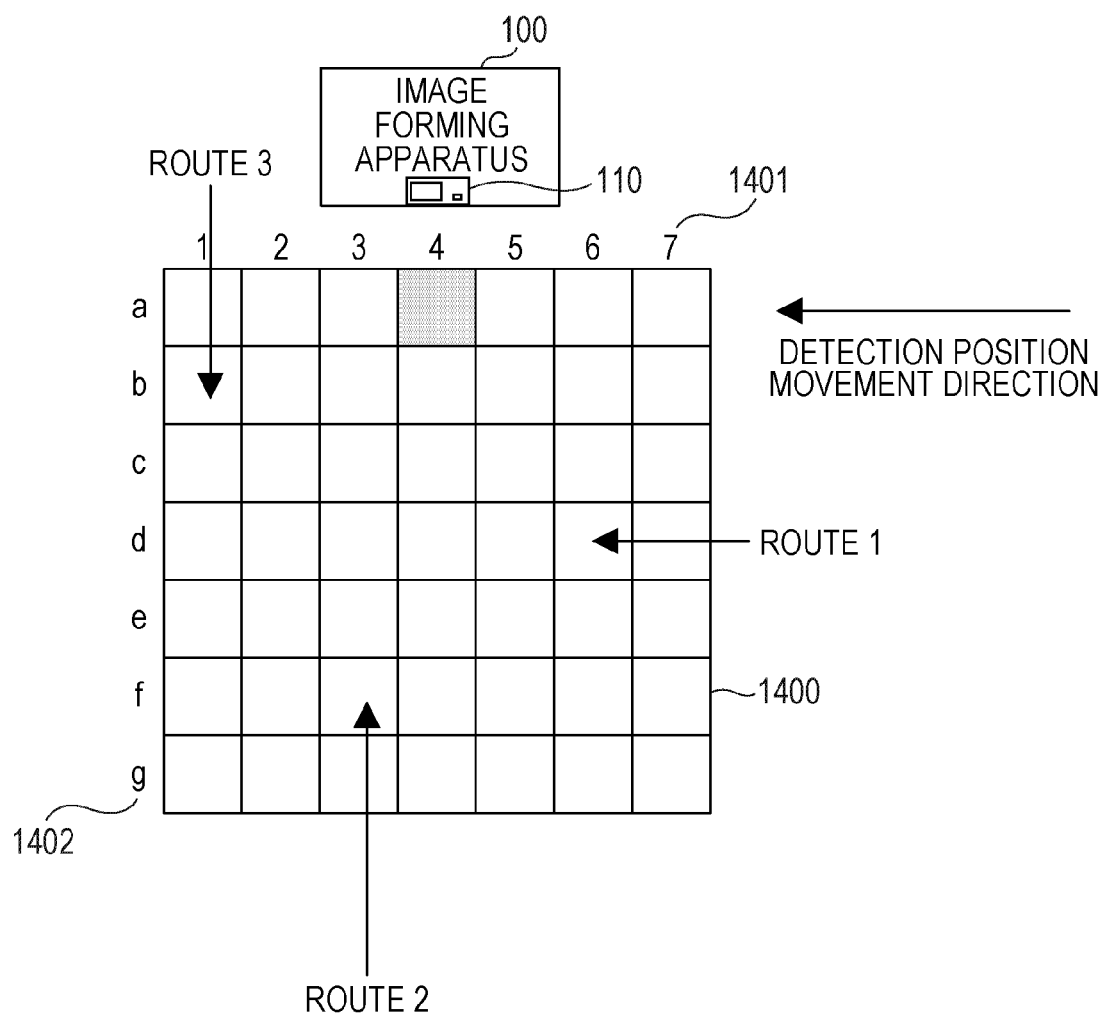

IMAGE FORMING APPARATUS, METHOD FOR CONTROLLING THE SAME, AND PROGRAM

BACKGROUND OF THE INVENTION

1. Field of the Invention

The present invention relates to control of an image forming apparatus that recovers to a normal power mode from a sleep mode using a human presence sensor.

2. Description of the Related Art

In these years, manufactures and users of single-function peripherals (SFPs) such as printers and multifunction peripherals (MFPs) having a plurality of functions are getting more environmentally conscious. Some of these apparatuses have a power-saving function, in which the apparatuses reduce the power consumption thereof by entering a sleep mode when the apparatuses are not being used.

Such an apparatus performs an operation for recovering from the sleep mode, in which the apparatus recovers to the normal power mode from the sleep mode when, for example, the apparatus has received a print job or the time has come. In addition, the apparatus recovers from the sleep mode when a user has come in front thereof to operate the apparatus and pressed a power-saving button for recovering to the normal power mode from the sleep mode.

Since the recovery from the sleep mode is not performed until the user presses the power-saving button and the operation for recovering from the sleep mode does not begin until the power-saving button is pressed, the user undesirably needs to wait for the establishment of the normal power mode in front of the apparatus.

Therefore, an apparatus capable of detecting whether or not there is a human body therearound using a sensor (hereinafter referred to as a human presence sensor) and automatically switching between the sleep mode and the normal power mode has been proposed (Japanese Patent Laid-Open No. 2008-168588). Such an apparatus begins the operation for recovering from the sleep mode by detecting an approaching human body using the human presence sensor and enters the normal power mode before a user comes in front of the apparatus to operate the apparatus, and accordingly the user can comfortably use the apparatus essentially without waiting time.

SUMMARY OF THE INVENTION

In Japanese Patent Laid-Open No. 2008-168588, however, a condition of recovery from the sleep mode when the state of the apparatus is an error state (a state in which any of paper out, out of toner, a paper jam, and the like has occurred) at the time of the recovery from the sleep mode, in which the apparatus recovers to the normal power mode from the sleep mode by detecting a human body using a human presence sensor, is not described.

For example, when the apparatus in the error state has entered the sleep mode, the apparatus does not recover to the normal power mode from the sleep mode and notify a user of the error state using a display unit or the like until the human presence sensor detects an approaching human body. Therefore, the user does not recognize that the apparatus is in the error state and remove the cause of the error or call a service person until he/she comes in front of an operation unit of the apparatus to operate the apparatus. That is, since the error state of the apparatus is recognized late, the error state of the apparatus is not removed in a timely manner, which impairs usability.

In addition, if the apparatus does not enter the sleep mode in the error state in order to secure usability and accordingly the display unit or the like is constantly trying to notify a user that the apparatus is in the error state, power is wasted by the display unit of the apparatus while the user is not around the apparatus and does not check the display unit.

The present invention provides a mechanism capable of suppressing wasteful power consumption while a user is not around the image forming apparatus while notifying a nearby user of an error state of the image forming apparatus, thereby prompting the user to remove the error state of the image forming apparatus.

An aspect of the present invention is an image forming apparatus including a first detection unit configured to detect an object existing in a first region, a second detection unit configured to detect an object existing in a second region, which is larger than the first region, a control unit configured to, if the first detection unit detects an object existing in the first region, shift the image forming apparatus from a power-saving state to a normal power state, a display unit configured to display information indicating a state of the image forming apparatus, and a power control unit configured to, when the state of the image forming apparatus is an error state, perform control such that power is supplied to the display unit if the second detection unit detects an object existing in the second region and, when the state of the image forming apparatus is not the error state, perform control such that power is supplied to the display unit if the first detection unit detects an object existing in the first region.

Further features of the present invention will become apparent from the following description of exemplary embodiments with reference to the attached drawings.

BRIEF DESCRIPTION OF THE DRAWINGS

FIG. 16 is a diagram illustrating examples of a route of a user detected by the human body detection unit according to the third embodiment.

DESCRIPTION OF THE EMBODIMENTS

Embodiments for implementing the present invention will be described hereinafter with reference to the drawings.

First Embodiment

Figure 1:
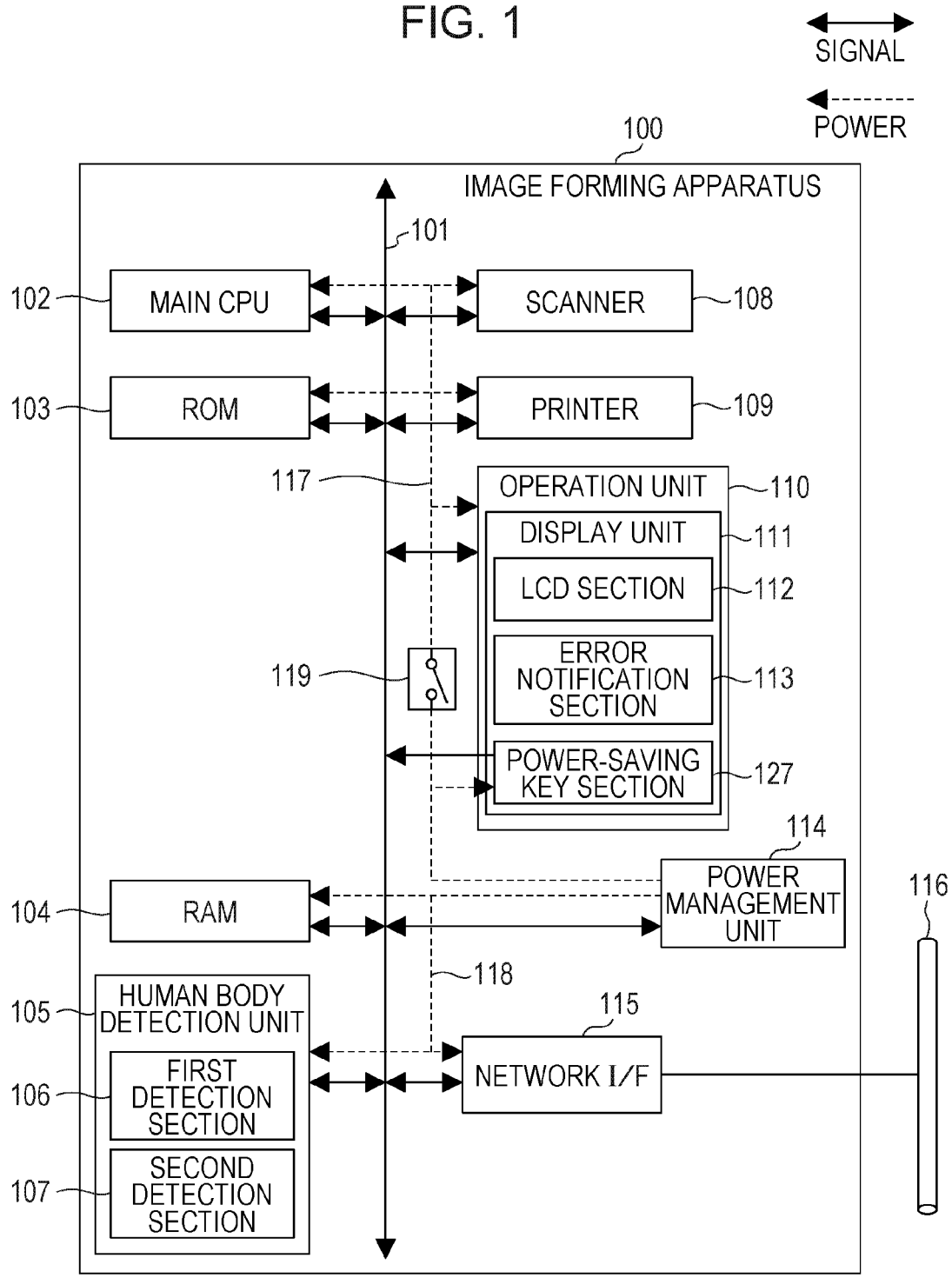
FIG. 1 is a block diagram illustrating the configuration of an image forming apparatus according to a first embodiment.

FIG. 1 is a block diagram illustrating an example of the configuration of an image forming apparatus 100 according to a first embodiment of the present invention.

A main central processing unit (CPU) 102 executes various types of control such as printing control by reading control programs stored in a read-only memory (ROM) 103. The ROM 103 stores the control programs and various pieces of data. A random-access memory (RAM) 104 is used as regions of a main memory and a work area of the main CPU 102.

A human body detection unit 105 includes a first detection section 106 and a second detection section 107. The first detection section 106 and the second detection section 107 are human presence sensors that detect an object approaching the image forming apparatus 100, such as a human body. The first detection section 106 is a passive sensor that receives infrared radiation from a surface of an object such as a human body, and is realized by, for example, a pyroelectric sensor. The second detection section 107 is an active sensor that emits infrared radiation, and is realized by, for example, an infrared reflective sensor. It is to be noted that the power consumption of the second detection section 107 is higher than that of the first detection section 106.

A scanner 108 generates image data by reading a document. The image data regarding the document read by the scanner 108 is used for printing, saving, transfer, or the like. Image data to be printed by a printer 109 is transmitted to the printer 109, and printed on a sheet by the printer 109. A network interface (I/F) 115 transmits and receives image data and various pieces of information through a local area network (LAN) 116.

An operation unit 110 is provided with a display unit 111. The display unit 111 includes an LCD section 112, an error notification section 113, and a power-saving key section 127. The operation unit 110 transmits information input thereto to the main CPU 102. In addition, the operation unit 110 displays information processed by the main CPU 102 on the LCD section 112 and the error notification section 113 included in the display unit 111.

In addition, upon detecting pressing of the power-saving key section 127 by a user, the operation unit 110 transmits a detection signal to a power management unit 114. Upon receiving the detection signal, the power management unit 114 switches a power state of the image forming apparatus 100 between a sleep mode and a normal power mode. The power management unit 114 supplies power to all or part of blocks of the image forming apparatus 100. The power management unit 114 realizes power saving by supplying power only to minimum necessary components when the image forming apparatus 100 is in the sleep mode.

When the power state of the image forming apparatus 100 is the normal power mode, a switch 119 is closed and the power management unit 114 supplies power to all the blocks through power lines 117 and 118. In addition, when the power state of the image forming apparatus 100 is the sleep mode, the switch 119 is opened and the power management unit 114 supplies power only to the RAM 104, the human body detection unit 105, the network I/F 115, and the power-saving key section 127 through the power line 118. The image forming apparatus 100 is an image forming apparatus capable of operating at least in the two power states, namely the normal power mode and the sleep mode, in which power consumption is lower than that in the normal power mode. It is to be noted that the blocks of the image forming apparatus 100 transmit signals to one another through a system bus 101.

Figure 2:
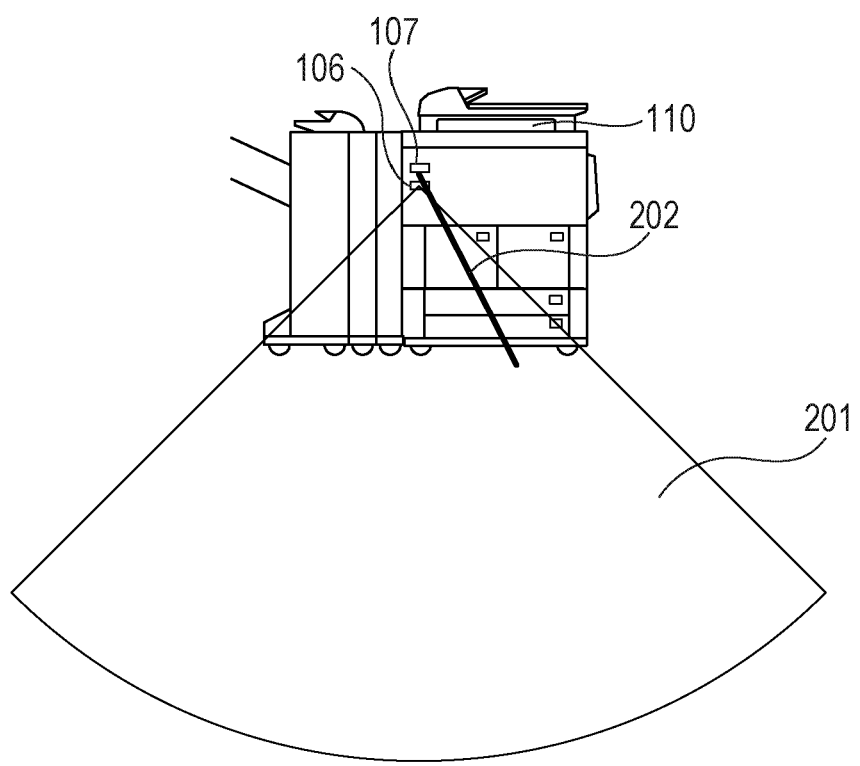
FIG. 2 is a diagram illustrating detection ranges of a human body detection unit according to the first embodiment.

FIG. 2 is a diagram illustrating detection ranges of a pyroelectric sensor and an infrared reflective sensor at a time when the pyroelectric sensor is used for the first detection section 106 of the human body detection unit 105 according to the first embodiment as a primary sensor and the infrared reflective sensor is used for the second detection section 107 as a secondary sensor.

The pyroelectric sensor is a passive human presence sensor and detects an approaching human body by detecting a change in temperature caused by infrared radiation naturally emitted from a heat source such as a human body. The pyroelectric sensor is characterized in that the power consumption thereof is low and the detection range thereof is relatively wide, but has disadvantages that a still object cannot be detected and the detection range thereof becomes narrower when a difference in temperature between environmental temperature and a human body is small. As illustrated in FIG. 2, the pyroelectric sensor, which is the primary sensor in the first detection section 106, is mounted on a front surface of the image forming apparatus 100 and has a radial detection range 201 directed obliquely downward.

On the other hand, the reflective sensor emits infrared radiation and detects a human body by checking a change in the amount of infrared radiation received thereby caused by reflection of the infrared radiation from the human body. The reflective sensor is characterized in that the activation time thereof is short and even a still object can be detected, but has disadvantages that the power consumption thereof is high and the detection range thereof is narrow. As illustrated in FIG. 2, the reflective sensor, which is the secondary sensor in the second detection section 107, is mounted on the front surface of the image forming apparatus 100, and a detection range 202 thereof is directed parallel to a floor inside the detection range 201 of the pyroelectric sensor, which is the primary sensor in the first detection section 106, so that a user standing in front of the image forming apparatus 100 trying to operate the image forming apparatus 100 can be detected.

Figure 3:
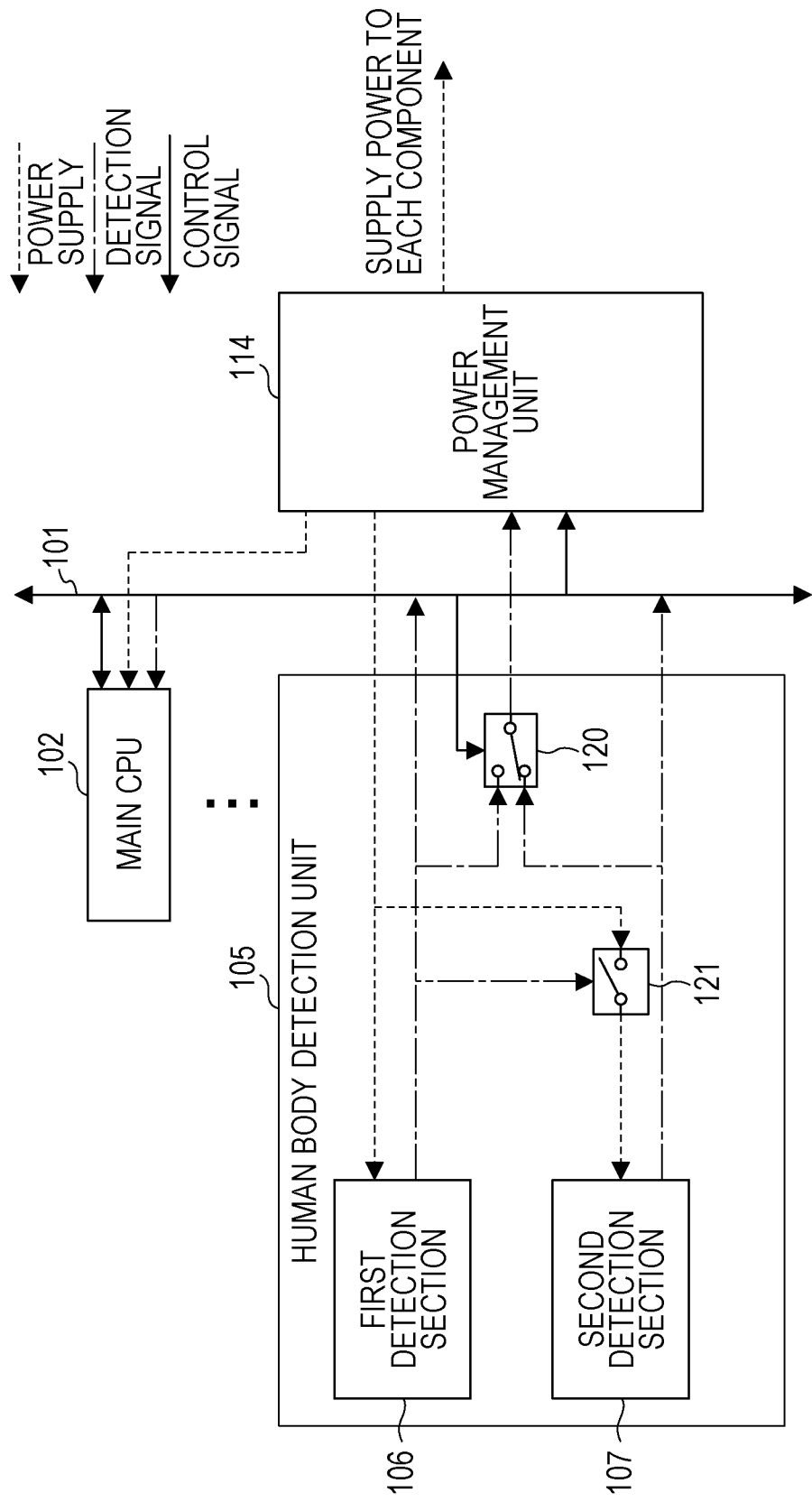
FIG. 3 is a block diagram illustrating the configurations of the human body detection unit and a power management unit according to the first embodiment.

FIG. 3 is a block diagram illustrating an example of the internal structure of the human body detection unit 105 and details of signals transmitted between the human body detection unit 105 and the power management unit 114 and power supplied from the power management unit 114 to the human body detection unit 105.

As described above, the human body detection unit 105 includes the pyroelectric sensor in the first detection section as the primary sensor and the reflective sensor in the second detection section 107 as the secondary sensor. A switch 120 is connected between the first detection section 106, the second detection section 107, and the power management unit 114, and determines whether the power management unit 114 is connected to the first detection section 106 or the second detection section 107 in accordance with a control signal received from the main CPU 102 through the system bus 101. Thus, either a detection signal of the first detection section 106 or a detection signal of the second detection section 107 can be transmitted to the power management unit 114.

Upon receiving either the detection signal of the first detection section 106 or the detection signal of the second detection section 107 through the switch 120 with the image forming apparatus 100 in the sleep mode, the power management unit 114 closes the switch 119 (FIG. 1) to supply power to the blocks connected to the power line 117 and recover the image forming apparatus 100 from the sleep mode.

When the state of the image forming apparatus 100 is a normal state, the power management unit 114 and the second detection section 107 are connected to each other by transmitting a control signal to the switch 120 from the main CPU 102. On the other hand, when the state of the image forming apparatus 100 is an error state (for example, a state in which any of paper out, out of toner, a paper jam, and the like has occurred), the power management unit 114 and the first detection section 106 are connected to each other by transmitting a control signal to the switch 120 from the main CPU 102.

In addition, a switch 121 is connected between the power management unit 114 and the second detection section 107. The switch 121 is closed only if the first detection section 106 detects an approaching human body and the switch 121 receives a detection signal from the first detection section 106. The power management unit 114 supplies power to the second detection section 107 through the switch 121.

Figure 4:
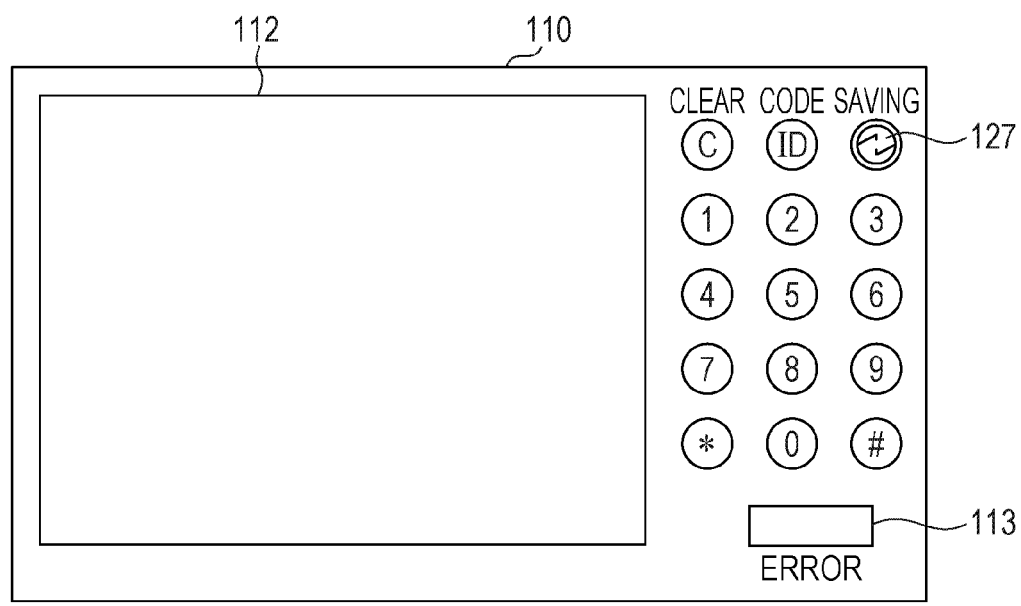
FIG. 4 is a diagram illustrating a liquid crystal display (LCD) section and an error notification section of an operation unit.

FIG. 4 is a diagram illustrating an example of the operation unit 110.

As illustrated in FIG. 4, the operation unit 110 includes the LCD section 112, the error notification section 113, and some other buttons. The LCD section 112 includes a liquid crystal panel and notifies a user of a message. It is to be noted that the LCD section 112 may include a touch panel. The error notification section 113 includes a light-emitting diode (LED), and when the state of the image forming apparatus 100 is the error state, the LED turns on to notify the user that the state of the image forming apparatus 100 is currently the error state.

Control of the power state of the image forming apparatus 100 according to the first embodiment will be described hereinafter with reference to FIGS. 5 to 7.

Figure 5:
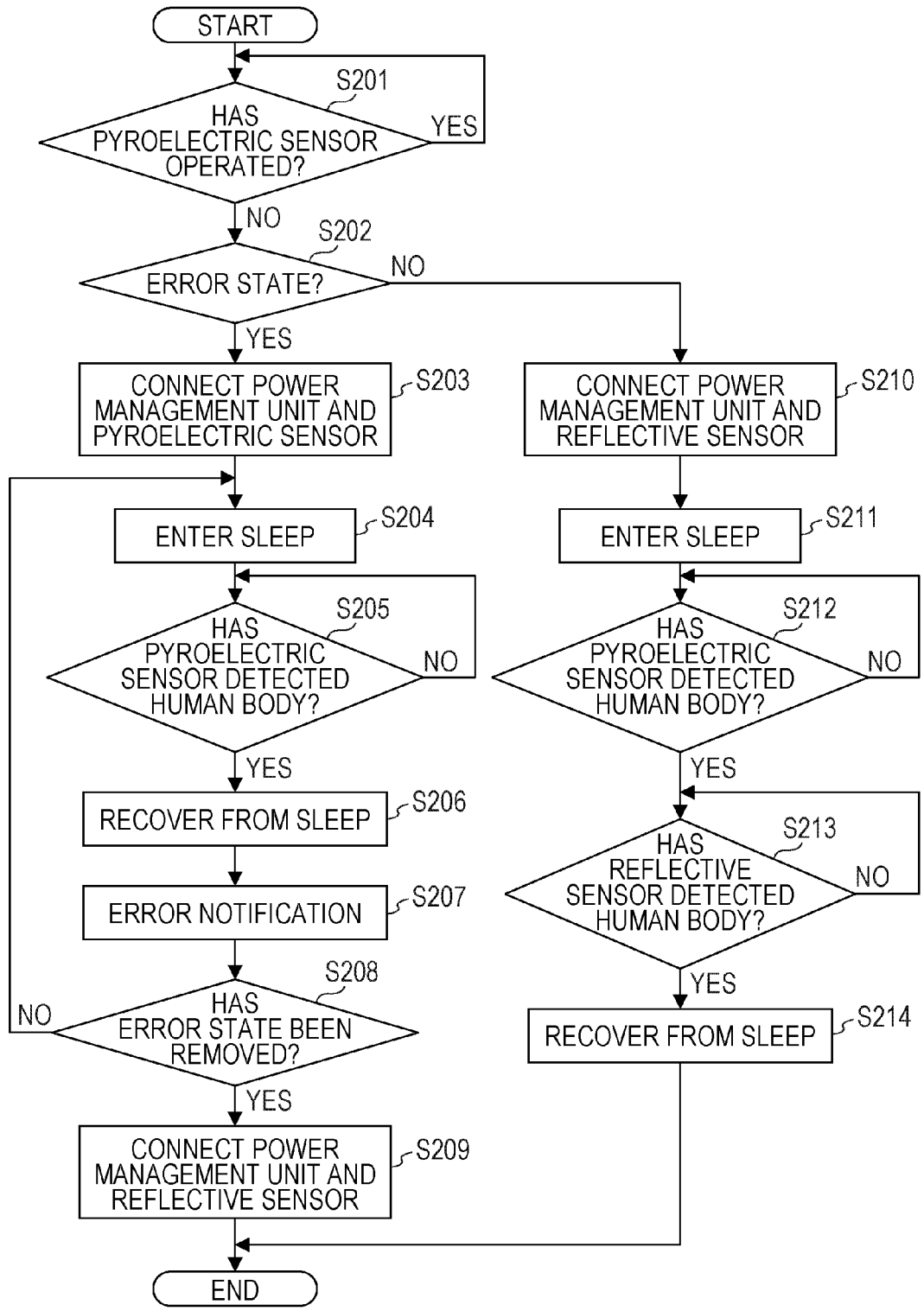
FIG. 5 is a flowchart illustrating a procedure for controlling the power state of the image forming apparatus according to the first embodiment.

FIG. 5 is a flowchart illustrating an example of a procedure for controlling the power state of the image forming apparatus 100 according to the first embodiment. FIG. 6 is a diagram illustrating an example of relationships between a transmission source of a detection signal transmitted to the power management unit 114 and a condition of recovery from the sleep mode. FIG. 7 is a diagram illustrating an example of an error notification message at a time when the image forming apparatus 100 is in the error state.

Immediately before the transition of the image forming apparatus 100 from the normal power mode to the sleep mode, the main CPU 102 begins a process illustrated in FIG. 5.

First, in S201, the main CPU 102 determines whether or not the pyroelectric sensor has operated (whether or not the pyroelectric sensor has detected a human body). Here, the power management unit 114 notifies the main CPU 102 whether or not the power management unit 114 has received a detection signal from the pyroelectric sensor used in the first detection section 106, and the main CPU 102 makes the above determination on the basis of this notification.

If it is determined in S201 that the pyroelectric sensor has operated (YES in S201), the main CPU 102 makes the determination in S201 again. On the other hand, if it is determined in S201 that the pyroelectric sensor has not operated (NO in S201), the main CPU 102 causes the process to proceed to S202.

In S202, the main CPU 102 determines whether or not the state of the image forming apparatus 100 is the error state. If it is determined that the state of the image forming apparatus 100 is not the error state (NO in S202), the main CPU 102 causes the process to proceed to S210. On the other hand, if it is determined that the state of the image forming apparatus 100 is the error state (YES in S202), the main CPU 102 causes the process to proceed to S203.

First, a case in which the image forming apparatus 100 is not in the error state, especially a case in which the image forming apparatus 100 is in a state (normal state) in which the image forming apparatus 100 can be used immediately after recovery from the sleep mode even if the image forming apparatus 100 has entered the sleep mode, will be described.

If the image forming apparatus 100 is not in the error state (NO in S202), the main CPU 102 transmits a control signal to the switch 120 in S210 so that the power management unit 114 and the second detection section 107 are connected to each other. As a result, a detection signal of the second detection section 107 can be transmitted to the power management unit 114. As illustrated in FIG. 6, in the normal state, the transmission source of a detection signal to the power management unit 114 is the second detection section 107, and the image forming apparatus 100 according to the first embodiment recovers from the sleep mode if the second detection section 107 detects a human body.

Next, in S211, the main CPU 102 instructs the power management unit 114 to establish the sleep mode. As a result of this instruction, the power management unit 114 opens the switch 119 illustrated in FIG. 2 to stop supplying power to the blocks connected to the power line 117. Thus, the image forming apparatus 100 enters the sleep mode.

If the pyroelectric sensor in the first detection section 106 detects a human body (S212), the first detection section 106 transmits a detection signal to the switch 121. Although the first detection section 106 also transmits a detection signal to the power management unit 114, the power management unit 114 does not receive the detection signal since the first detection section 106 and the power management unit 114 are not connected to each other by the switch 120. The switch 121 receives the detection signal from the first detection section 106 and closes. As a result, the power management unit 114 supplies power to the second detection section 107.

If the reflective sensor in the second detection section 107 detects a human body (S213), the second detection section 107 transmits a detection signal to the power management unit 114. Upon receiving the detection signal from the second detection section 107, the power management unit 114 turns on the switch 119 illustrated in FIG. 2 to begin to supply power to the blocks connected to the power line 117. As a result, the image forming apparatus 100 recovers to the normal mode from the sleep mode (S214). That is, when the state of the image forming apparatus 100 is the normal state, the recovery from the sleep mode is performed if the reflective sensor detects a human body.

Next, a case in which the image forming apparatus 100 is in the error state will be described.

If the image forming apparatus 100 is in the error state (YES in S202), the main CPU 102 transmits a control signal to the switch 120 in S203 so that the power management unit 114 and the first detection section 106 are connected to each other. As a result, a detection signal of the first detection section 106 can be transmitted to the power management unit 114. As illustrated in FIG. 6, in the error state, the transmission source of a detection signal to the power management unit 114 is the first detection section 106, and the image forming apparatus 100 recovers from the sleep mode if the first detection section 106 detects a human body.

Next, in S204, the main CPU 102 instructs the power management unit 114 to establish the sleep mode. As a result of this instruction, the power management unit 114 opens the switch 119 illustrated in FIG. 2 to stop supplying power to the blocks connected to the power line 117. Thus, the image forming apparatus 100 enters the sleep mode.

If the pyroelectric sensor in the first detection section 106 detects a human body (YES in S205), the first detection section 106 transmits a detection signal to the power management unit 114. Upon receiving the detection signal from the first detection section 106, the power management unit 114 closes the switch 119 illustrated in FIG. 2 to begin to supply power to the blocks connected to the power line 117. As a result, the image forming apparatus 100 recovers to the normal mode from the sleep mode (S206). That is, when the image forming apparatus 100 is in the error state, the image forming apparatus 100 shifts from the sleep mode, in which the LCD section 112 cannot display the state of the image forming apparatus 100, to the normal mode, in which the LCD section 112 can display the state of the image forming apparatus 100, if the pyroelectric sensor detects a human body.

After the recovery from the sleep mode, the main CPU 102 transmits a signal to the LCD section 112 of the display unit 111 provided for the operation unit 110 in S207 so that the LCD section 112 displays the content of the error state of the image forming apparatus 100. In addition, the main CPU 102 transmits a signal to the error notification section 113 in order to turn on the LED. By these signals, the error notification message illustrated in FIG. 7 is displayed on the display unit 111.

Figures 6, 7:
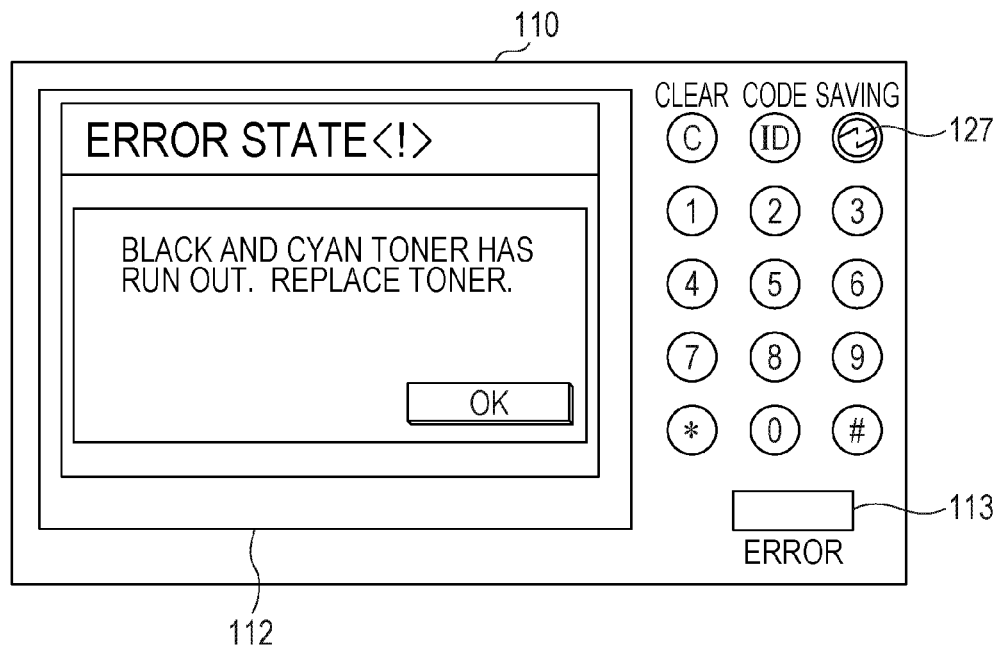
FIG. 6 is a diagram illustrating factors in recovering the image forming apparatus from a sleep mode according to the first embodiment.
FIG. 7 is a diagram illustrating an example of an error notification message at a time when the image forming apparatus is in an error state.

As illustrated in FIG. 7, the image forming apparatus 100 notifies, using the error notification message, the user that the image forming apparatus 100 is in the error state and of the content of the error, thereby prompting the user to remove the error state. Thus, when the state of the image forming apparatus 100 is the error state, a user (for example, a passerby) outside the reflective sensor detection range 202 but within the pyroelectric sensor detection range 201 is notified of the error state, in order to prompt the user to remove the error. Therefore, it can be expected that the user or the like who has read the message removes the error state and accordingly the downtime of the image forming apparatus 100 is reduced.

Next, in S208, the main CPU 102 determines whether or not the error state of the image forming apparatus 100 has been removed by, for example, the user or a service person sent for by the user. If it is determined that the error state of the image forming apparatus 100 has not been removed (NO in S213), the main CPU 102 causes the process to return to S204 and performs control such that the image forming apparatus 100 enters the sleep mode again.

On the other hand, if it is determined that the error state of the image forming apparatus 100 has been removed (YES in S208), the main CPU 102 causes the process to proceed to S209.

In S209, the main CPU 102 transmits a control signal to the switch 120 so that the power management unit 114 and the second detection section 107 are connected to each other.

Upon receiving the control signal from the main CPU 102, the switch 120 connects the power management unit 114 and the second detection section 107 to each other, so that the second detection section 107 can transmit a detection signal to the power management unit 114.

As described above, the condition of recovery from the sleep mode based on detection by a human presence sensor is different between when the state of the image forming apparatus 100 is the normal state and when the state of the image forming apparatus 100 is the error state. Therefore, in the error state, the image forming apparatus 100 can suppress the power consumption thereof by entering the sleep mode while there is no user nearby, and if there is a user nearby, the image forming apparatus 100 can prompt the user to remove the error state by recovering from the sleep mode and notifying the user of the error state. It is to be noted that the error state refers to, for example, an abnormal state such as a typical paper jam, out of toner, paper out or an error that needs to be removed by a service person, such as an error to be removed by replacing a component or a paper jam at a particular portion that is difficult for the user to remove, but the error state is not limited to one of these.

It is to be noted that although, when the state of the image forming apparatus 100 is the error state, the power management unit 114 supplies power to each component if the pyroelectric sensor in the first detection section 106 detects a human body, power may be supplied only to a component (for example, only to the operation unit 110) necessary to notify the user of the error, instead. In addition, the operation unit 110 may include a speaker and notify the user of an error using a sound, a warning tone, or the like.

In addition, in this embodiment, a case has been described in which the pyroelectric sensor and the reflective sensor are used for the human body detection unit 105 of the image forming apparatus 100 as human presence sensors. However, the human presence sensors that can be used for the human body detection unit 105 are not limited to the pyroelectric sensor and the reflective sensor. Other types of human presence sensors may be used insofar as human presence sensors of more than two types whose detection ranges are different are used.

Second Embodiment

In the first embodiment, a configuration has been described in which the two detection sections, namely the first detection section 106 for which the pyroelectric sensor is used and the second detection section 107 for which the reflective sensor is used, are included in the human body detection unit 105 of the image forming apparatus 100. If reduction of the cost of the image forming apparatus 100 is focused upon, however, a configuration can be used in which the reflective sensor is not used for the second detection section 107 and only the first detection section 106 is included in the human body detection unit 105. This configuration will be described hereinafter in a second embodiment.

Figure 8:
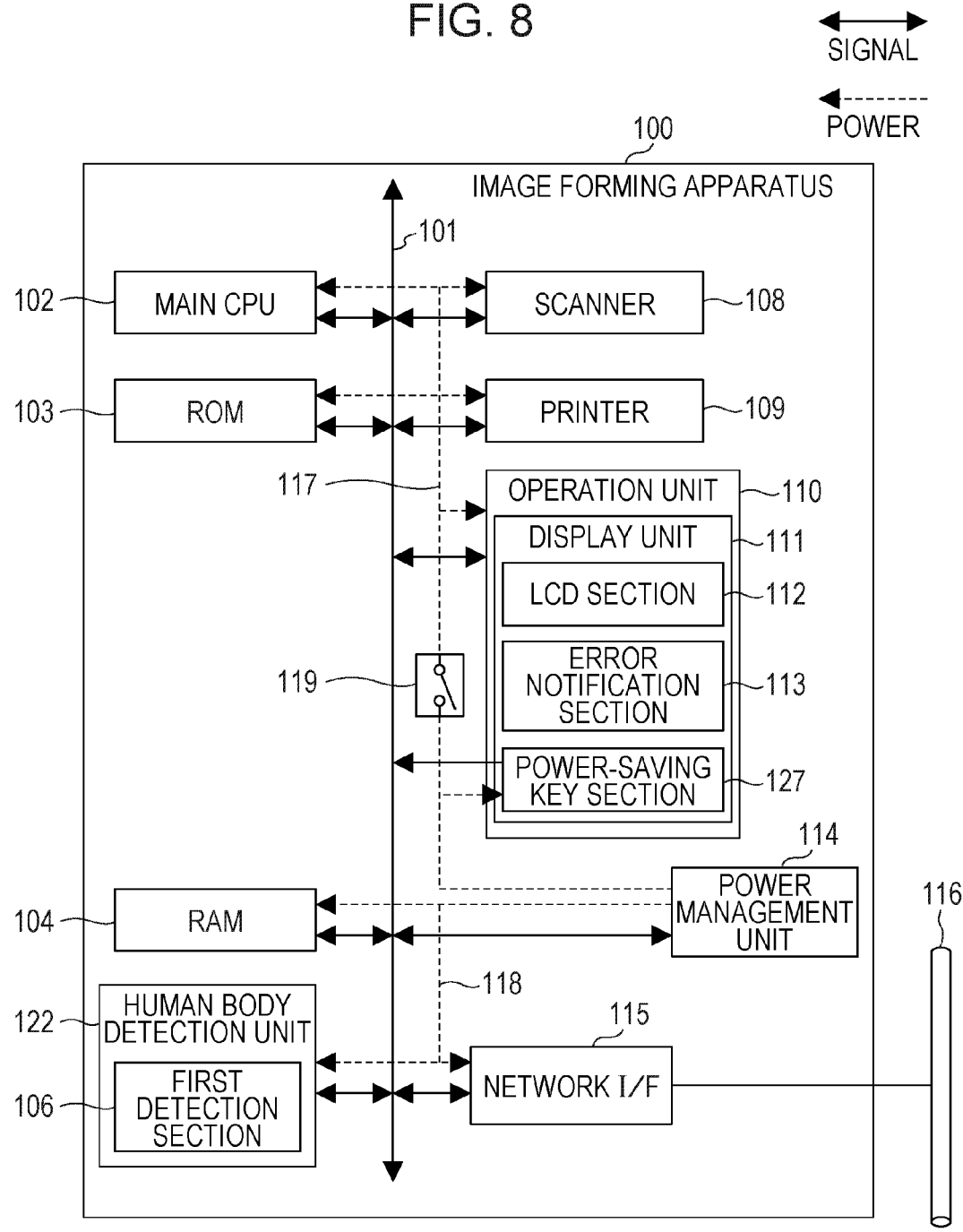
FIG. 8 is a block diagram illustrating the configuration of an image forming apparatus according to a second embodiment.

FIG. 8 is a block diagram illustrating an example of the configuration of an image forming apparatus 100 according to the second embodiment. It is to be noted that description of the same components as those according to the first embodiment is omitted, and only differences will be described.

The image forming apparatus 100 includes a human body detection unit 122, and the human body detection unit 122 includes the first detection section 106. The power management unit 114 supplies power to the first detection section 106 through the power line 118. In the second embodiment, the degree of sensitivity of the first detection section 106 for detecting a human body can be changed.

Figure 9:
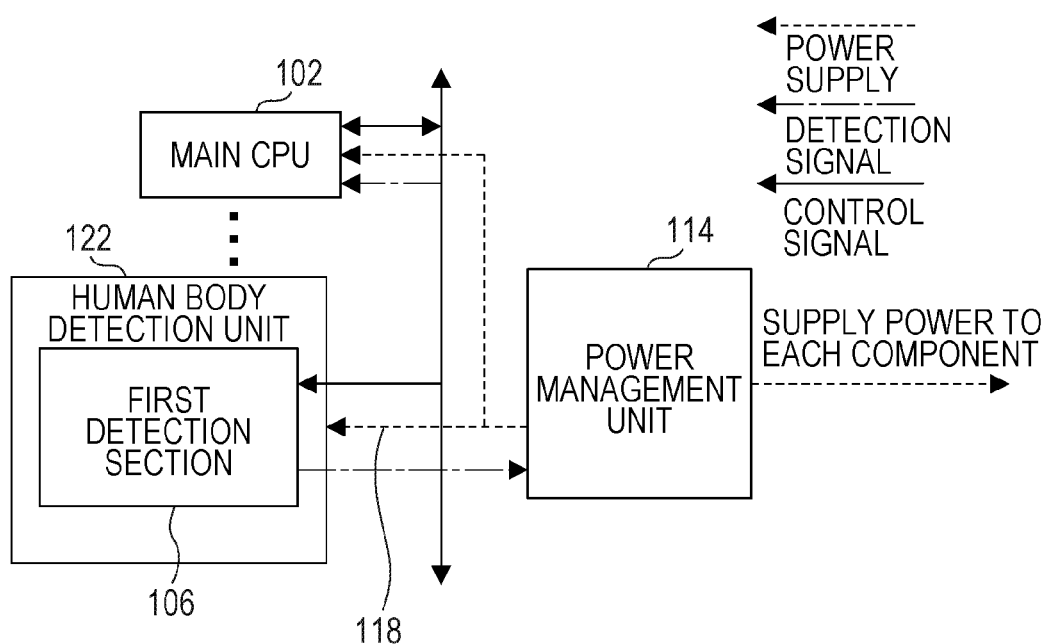
FIG. 9 is a block diagram illustrating the configurations of a human body detection unit and a power management unit according to the second embodiment.

FIG. 9 is a block diagram illustrating an example of the internal structure of the human body detection unit 122 and details of signals transmitted between the human body detection unit 122 and the power management unit 114 and power supplied from the power management unit 114 to the human body detection unit 122.

The power management unit 114 supplies power to the first detection section 106 through the power line 118. In addition, the main CPU 102 can change the degree of the sensor sensitivity of the pyroelectric sensor in the first detection section 106 by transmitting a control signal to the first detection section 106.

Control of the power state of the image forming apparatus 100 according to the second embodiment will be described with reference to FIGS. 10 and 11.

Figure 10:
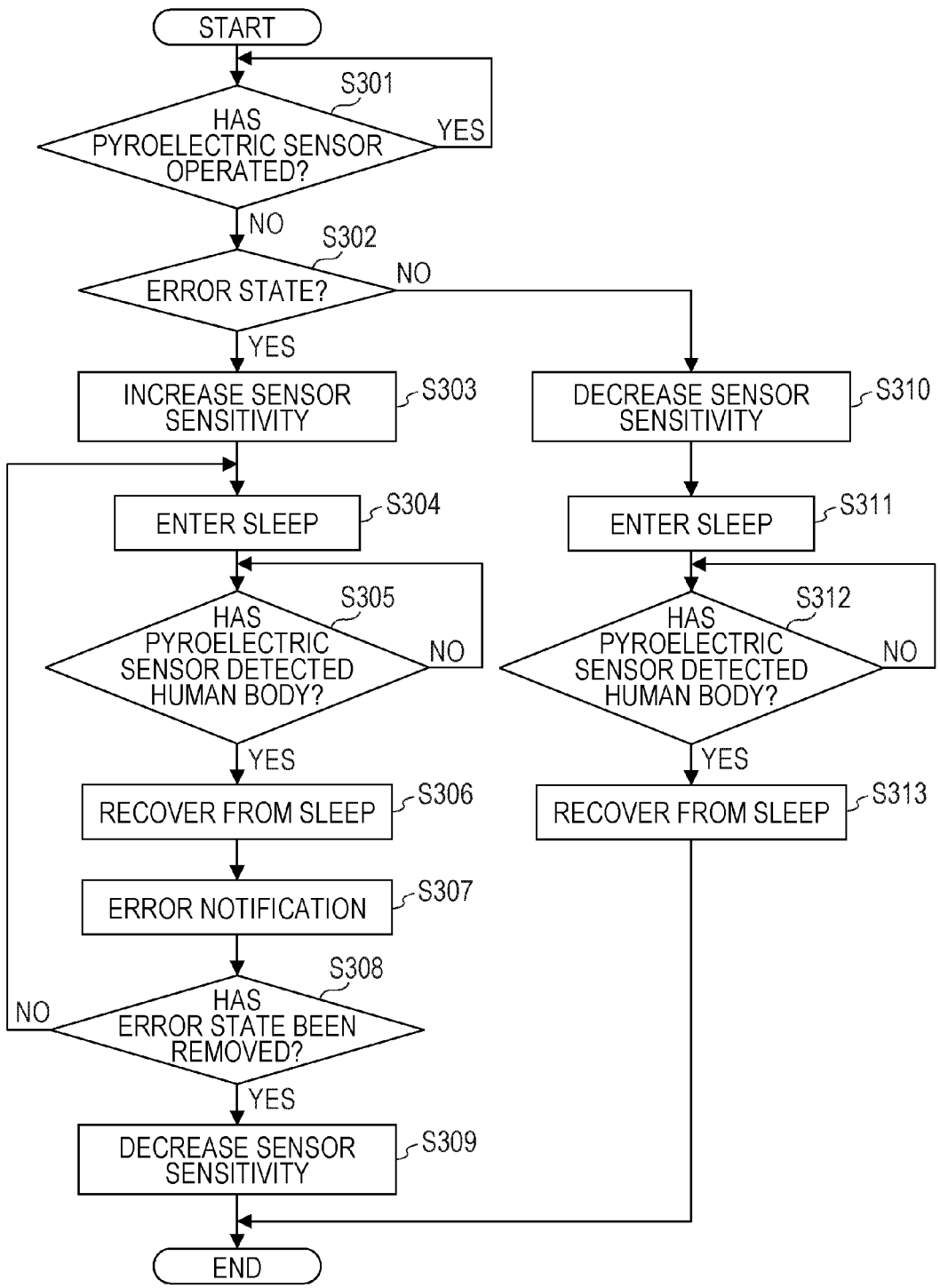
FIG. 10 is a flowchart illustrating a procedure for controlling the power state of the image forming apparatus according to the second embodiment.

FIG. 10 is a flowchart illustrating an example of a procedure for controlling the power state of the image forming apparatus 100 according to the second embodiment. FIG. 11 is a diagram illustrating detection ranges of the pyroelectric sensor at a time when the state of the image forming apparatus 100 according to the second embodiment is the normal state and when the state of the image forming apparatus 100 is the error state.

Immediately before the image forming apparatus 100 shifts from the normal power mode to the sleep mode, the main CPU 102 begins a process illustrated in FIG. 10. It is to be noted that processing in S301 and S302 are the same as that in S201 and S202, respectively, illustrated in FIG. 5, and accordingly description thereof is omitted.

First, a case in which the image forming apparatus 100 is not in the error state, especially a case in which the image forming apparatus 100 is in a state (normal state) in which the image forming apparatus 100 can be used immediately after recovery from the sleep mode even if the image forming apparatus 100 has entered the sleep mode, will be described.

If the image forming apparatus 100 is not in the error state (NO in S302), the main CPU 102 transmits a control signal to the first detection section 106 in S310 so that the sensor sensitivity of the pyroelectric sensor becomes lower than that of the pyroelectric sensor at a time when the state of the image forming apparatus 100 is the error state. Upon receiving the control signal from the main CPU 102, the first detection section 106 decreases the sensor sensitivity of the pyroelectric sensor. As a result, the sensor sensitivity of the pyroelectric sensor decreases, thereby reducing the size of the detection range of the pyroelectric sensor. The detection range of the pyroelectric sensor is illustrated in FIG. 11.

Figure 11:
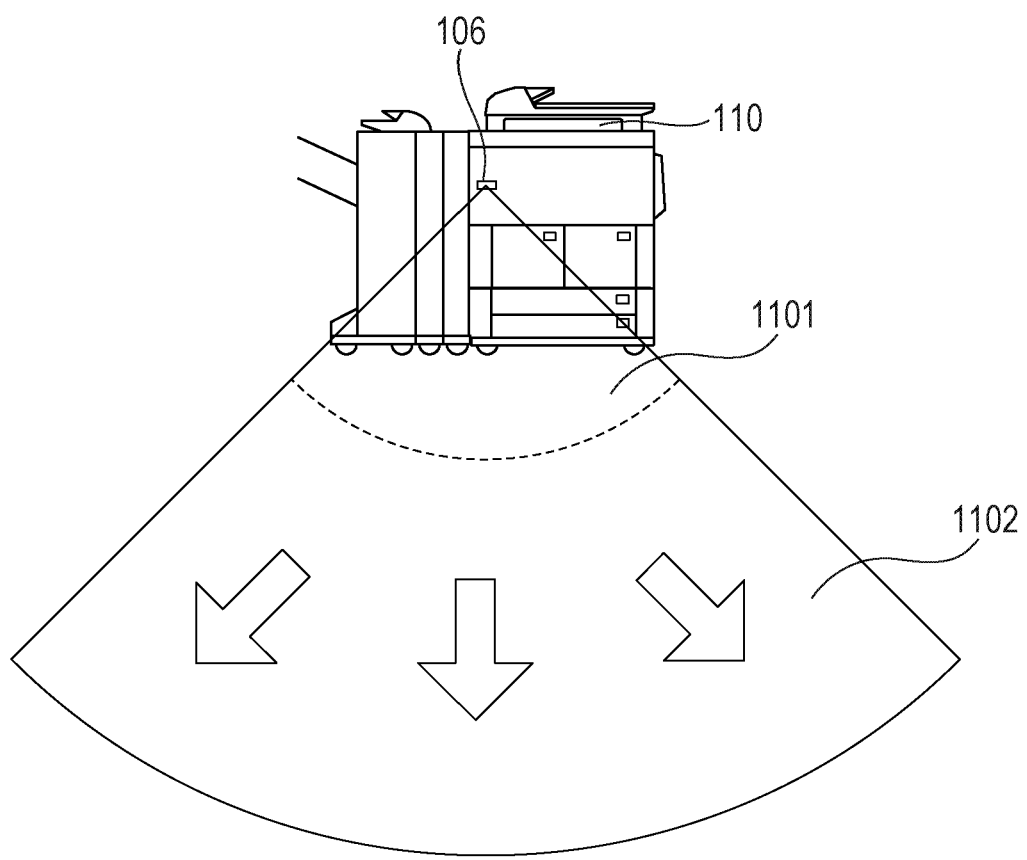
FIG. 11 is a diagram illustrating detection ranges of the human body detection unit according to the second embodiment.

As indicated by a detection range 1101 illustrated in FIG. 11, when the state of the image forming apparatus 100 is the normal state, the detection range of the pyroelectric sensor is just large enough to be able to detect the body of a user standing in front of the image forming apparatus 100 trying to operate the operation unit 110. In addition, as indicated by a detection range 1102, when the state of the image forming apparatus 100 is the error state, which will be described later, the detection range is large enough to be able to detect the body of a passerby who is passing by the image forming apparatus 100.

Next, processing in S311 is the same as that in S211 illustrated in FIG. 5, and accordingly description thereof is omitted. If the pyroelectric sensor in the first detection section 106 detects a human body (YES in S312), the first detection section 106 transmits a detection signal to the power management unit 114. Upon receiving the detection signal from the first detection section 106, the power management unit 114 closes the switch 119 illustrated in FIG. 8 to begin to supply power to the blocks connected to the power line 117. As a result, the image forming apparatus 100 recovers to the normal mode from the sleep mode (S313).

Next, a case in which the image forming apparatus 100 is in the error state will be described.

If the image forming apparatus 100 is in the error state (YES in S302), the main CPU 102 transmits a control signal to the first detection section 106 in S303 so that the sensor sensitivity of the pyroelectric sensor becomes higher than that of the pyroelectric sensor at a time when the image forming apparatus 100 is in the normal state. Upon receiving the control signal from the main CPU 102, the first detection section 106 increases the sensor sensitivity of the pyroelectric sensor. As a result, as indicated by the detection range 1102 illustrated in FIG. 11, the sensor sensitivity of the pyroelectric sensor increases, thereby expanding the detection range of the pyroelectric sensor.

Next, processing in S304 is the same as that in S204 illustrated in FIG. 5, and accordingly description thereof is omitted. If the pyroelectric sensor in the first detection section 106 detects a human body (YES in S305), the first detection section 106 transmits a detection signal to the power management unit 114. Upon receiving the detection signal from the first detection section 106, the power management unit 114 closes the switch 119 illustrated in FIG. 8 to begin to supply power to the blocks connected to the power line 117. As a result, the image forming apparatus 100 recovers to the normal mode from the sleep mode (S306).

Next, processing in S307 and S308 is the same as that in S207 and S208, respectively, illustrated in FIG. 5, and accordingly description thereof is omitted. In S309, the main CPU 102 transmits a control signal to the first detection section 106 so that the sensor sensitivity of the pyroelectric sensor becomes lower than the above-described sensor sensitivity of the pyroelectric sensor at a time when the state of the image forming apparatus 100 is the error state. Upon receiving the control signal from the main CPU 102, the first detection section 106 decreases the sensor sensitivity of the pyroelectric sensor. As a result, the sensor sensitivity of the pyroelectric sensor decreases, thereby reducing the size of the detection range of the pyroelectric sensor as indicated by the detection range 1101 illustrated in FIG. 11.

As described above, when the state of the image forming apparatus 100 including only the pyroelectric sensor as the human presence sensor is the error state, the sensor sensitivity of the human presence sensor is set higher than when the state of the image forming apparatus 100 is the normal state. As a result, the detection range of the human presence sensor expands. Therefore, when the state of the image forming apparatus 100 is the error state, the image forming apparatus 100 can suppress the power consumption thereof by entering the sleep mode while there is no user nearby, and if there is a user nearby, the image forming apparatus 100 can prompt the user to remove the error state by recovering from the sleep mode and notifying the user of the error state.

In addition, in this embodiment, a configuration has been described in which the pyroelectric sensor is used for the human body detection unit 105 of the image forming apparatus 100. However, the human presence sensor used for the human body detection unit 105 is not limited to the pyroelectric sensor, and another type of human presence sensor whose detection sensitivity can be changed may be used, instead.

Third Embodiment

In the first embodiment, a configuration has been described in which the pyroelectric sensor is used for the first detection section 106 and the reflective sensor is used for the second detection section 107 in the human body detection unit 105 of the image forming apparatus 100. In addition, in the second embodiment, a configuration has been described in which only the pyroelectric sensor is used for the first detection section 106 in the human body detection unit 122. In these configurations, whether or not there is a user around the image forming apparatus 100 can be determined by the human presence sensor(s), but it is difficult to accurately determine whether or not it is expected that the user detected by the human presence sensor(s) notices an error state message displayed on the operation unit 110. Therefore, in a third embodiment, a pyroelectric array sensor capable of detecting presence of a human in a plurality of regions is used for the first detection section 106 in order to determine whether or not it is expected that a detected user notices the error state message.

Figure 12:
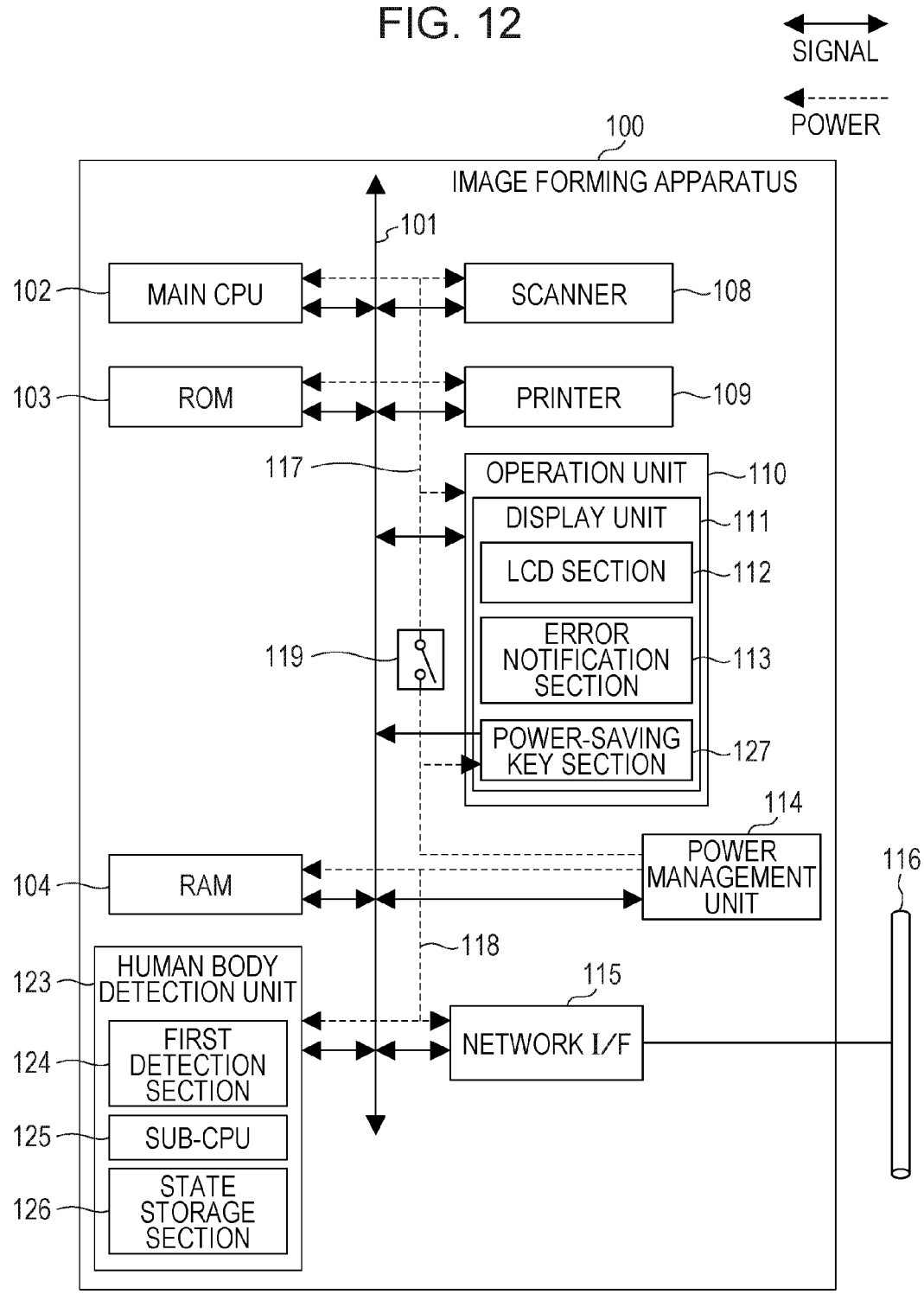
FIG. 12 is a block diagram illustrating the configuration of an image forming apparatus according to a third embodiment.

FIG. 12 is a block diagram illustrating an example of the configuration of an image forming apparatus 100 according to the third embodiment. It is to be noted that description of the same components as those according to the first and second embodiments is omitted, and only differences will be described.

The image forming apparatus 100 includes a human body detection unit 123, and the human body detection unit 123 includes a first detection section 124, a sub-CPU 125, and a state storage section 126. With respect to supply of power, the power management unit 114 supplies power to the first detection section 124, the sub-CPU 125, and the state storage section 126 through the power line 118. Upon receiving a control signal from the sub-CPU 125 when the image forming apparatus 100 is in the sleep mode, the power management unit 114 closes the switch 119 to supply power to the blocks connected to the power line 117. As a result, the image forming apparatus 100 shifts from the sleep mode to the normal power mode. The first detection section 124 according to this embodiment is capable of detecting a human body in a plurality of regions.

Figure 13:
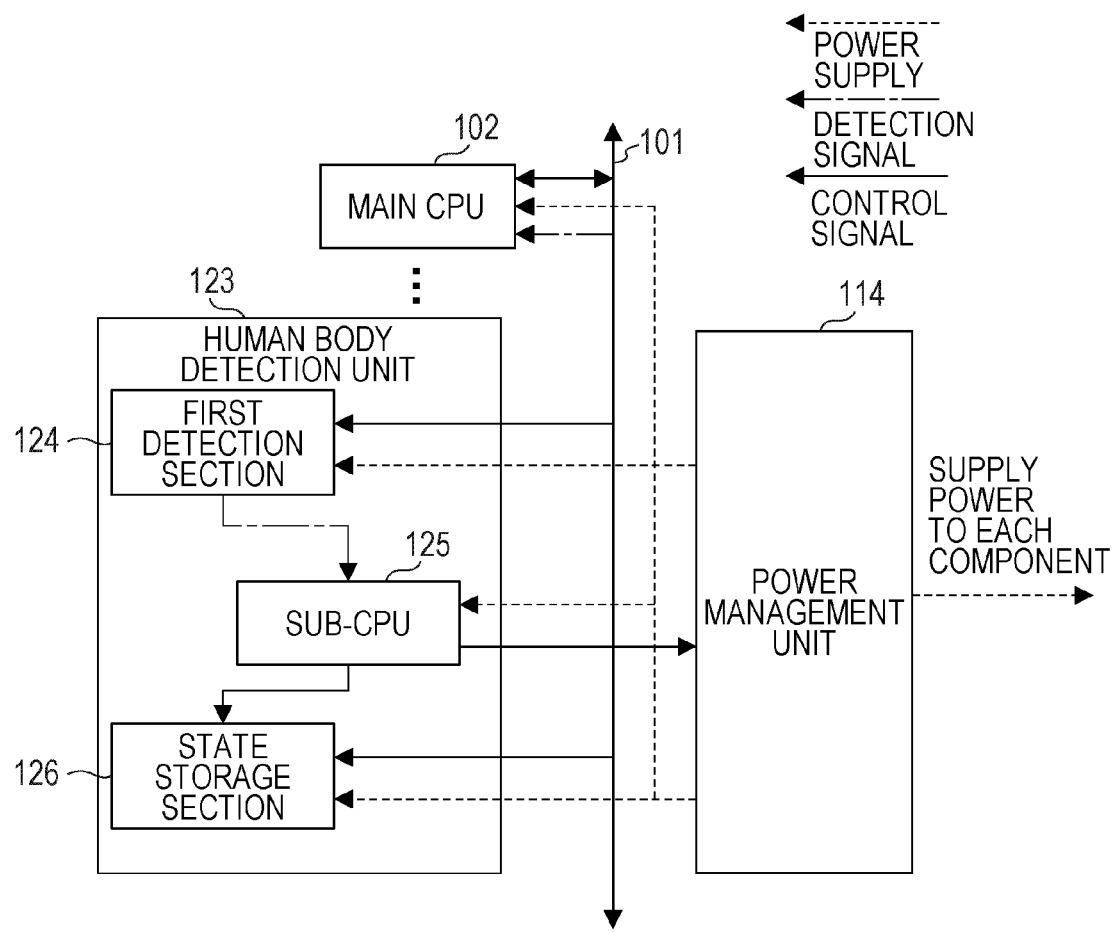
FIG. 13 is a block diagram illustrating the configurations of a human body detection unit and a power management unit according to the third embodiment.

FIG. 13 is a diagram illustrating an example of the internal structure of the human body detection unit 123 and details of signals transmitted between the human body detection unit 123 and the power management unit 114 and power supplied from the power management unit 114 to the human body detection unit 123.

The main CPU 102 records, in the state storage section 126, information indicating whether the state of the image forming apparatus 100 is the normal state or the error state. When the image forming apparatus 100 is in the sleep mode, the sub-CPU 125 receives a detection signal from the first detection section 124 and transmits a control signal to the state storage section 126 in order to read the information recorded in the state storage section 126 and determine whether or not to transmit a control signal to the power management unit 114. It is to be noted that the sub-CPU 125 performs these operations by executing a program stored in a ROM, which is not illustrated.

Figure 14:
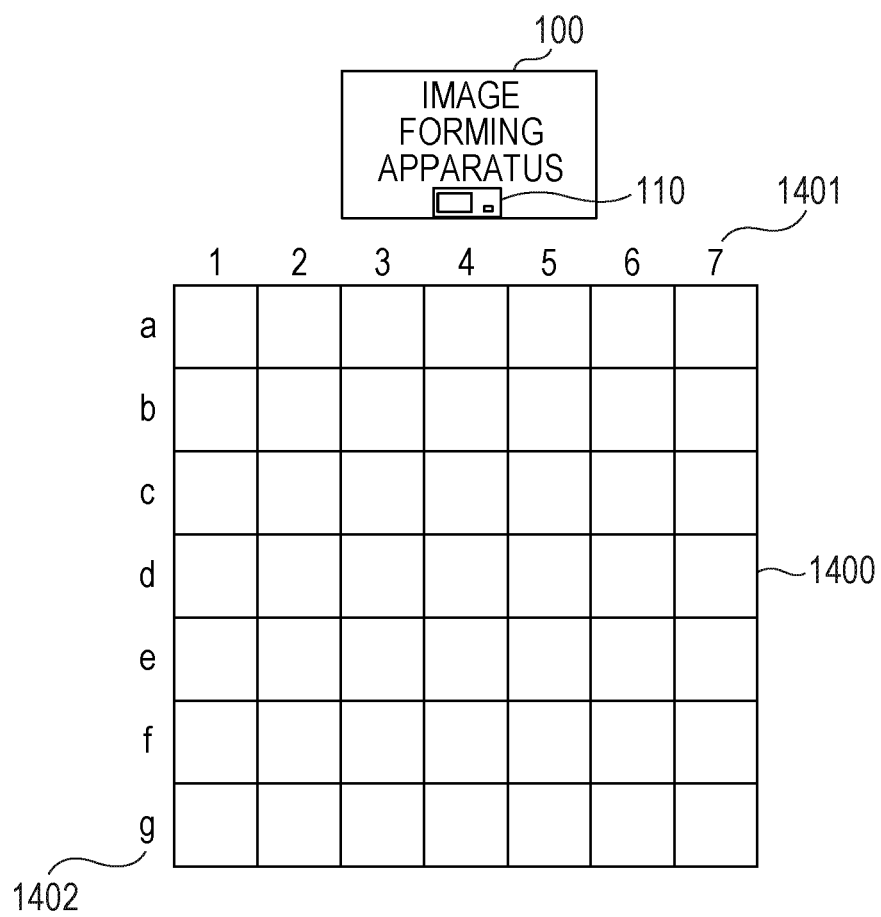
FIG. 14 is a diagram illustrating a positional relationship between a detection range of the human body detection unit and the image forming apparatus according to the third embodiment.

FIG. 14 is a diagram illustrating an example of a positional relationship between the image forming apparatus 100 and the detection range of the pyroelectric array sensor used for the first detection section 124 viewed from above the image forming apparatus 100.

The pyroelectric array sensor in this embodiment is capable of detecting presence of a human body or the like in a plurality of regions. Therefore, the sub-CPU 125 can determine whether or not it is expected that a user notices an error notification issued by the operation unit 110 on the basis of the positions of regions in which the user has been detected within the detection range of the pyroelectric array sensor and order of the detection.

In the third embodiment, as illustrated in FIG. 14, the plurality of regions in which the pyroelectric array sensor in the first detection section 124 can individually detect a human body are indicated by 7×7 cells. It is to be noted that the plurality of regions in which the pyroelectric array sensor in the first detection section 124 can individually detect a human body are not limited to the 7×7 cells.

In FIG. 14, the entirety of a detection range 1400 of the pyroelectric array sensor in the first detection section 124 is illustrated. The detection range 1400 is divided into a plurality of regions (for example, 7×7 cells) in which the pyroelectric array sensor in the first detection section 124 can individually detect a human body. Names 1401 indicate columns of the cells at the positions of the detection regions, and are 1, 2, 3, 4, 5, 6, and 7 from a leftmost column relative to the image forming apparatus 100. Names 1402 indicate rows of the cells at the positions of the detection regions, and are a, b, c, d, e, f, and g from a nearest row to the image forming apparatus 100. In this embodiment, the positions of the regions and the positions at which the first detection section 124 has detected a human body will be referred to by, for example, calling a leftmost region nearest to the image forming apparatus 100 a1 and a rightmost region nearest to the image forming apparatus 100 a7 relative to the image forming apparatus 100.

Control of the power state of the image forming apparatus 100 according to the third embodiment will be described hereinafter with reference to FIGS. 15 and 16.

Figure 15:
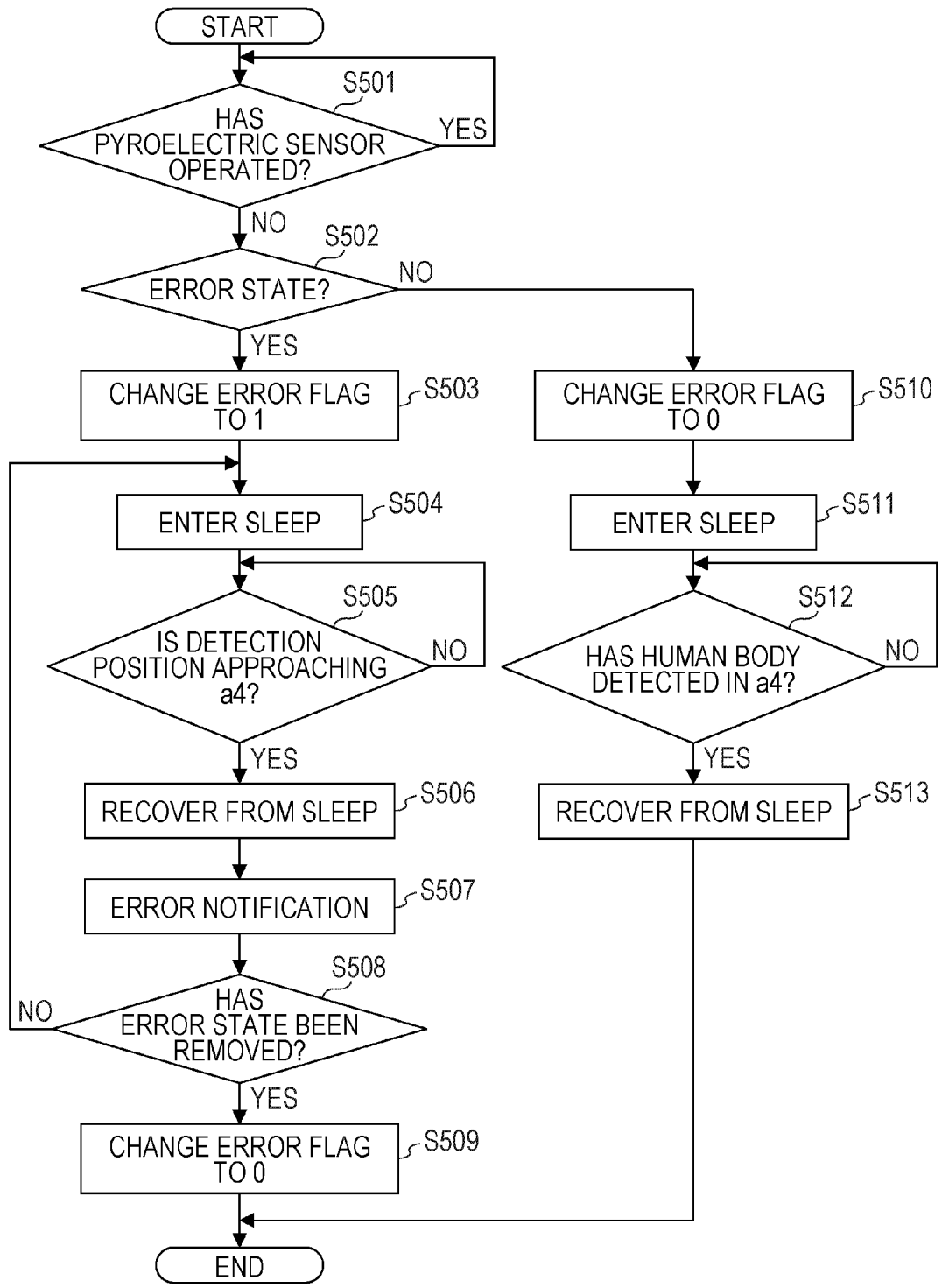
FIG. 15 is a flowchart illustrating a procedure for controlling the power state of the image forming apparatus according to the third embodiment.

FIG. 15 is a flowchart illustrating an example of a procedure for controlling the power state of the image forming apparatus 100 according to the third embodiment. FIG. 16 is a diagram illustrating examples of a route of a user detected by the human presence sensor according to the third embodiment. It is to be noted that processing performed by the main CPU 102 illustrated in the flowchart of FIG. 15 includes a step executed by the main CPU 102 by reading a program stored in the ROM 103 and a step executed by the sub-CPU 125 by reading a program stored in the ROM, which is not illustrated. It is to be noted that, in FIG. 15, S501 to S513 indicate steps.

Immediately before the image forming apparatus 100 shifts from the normal power mode to the sleep mode, the main CPU 102 begins a process illustrated in FIG. 15. It is to be noted that processing in S501 and S502 is the same as that in S201 and S202, respectively, illustrated in FIG. 5, and accordingly description thereof is omitted.

First, a case in which the image forming apparatus 100 is not in the error state, especially a case in which the image forming apparatus 100 is in a state (normal state) in which the image forming apparatus 100 can be used immediately after recovery from the sleep mode even if the image forming apparatus 100 has entered the sleep mode, will be described.

If the image forming apparatus 100 is not in the error state (NO in S502), the main CPU 102 changes a value of an error flag recorded in the state storage section 126 to "0" through the system bus 101 in S510. It is to be noted that the error flag indicates that the image forming apparatus 100 is not in the error state when the value thereof is "0".

Next, processing in S511 is the same as that in S211 illustrated in FIG. 5, and accordingly description thereof is omitted. If the pyroelectric array sensor in the first detection section 124 detects a user, the first detection section 124 transmits a detection signal including detection position information to the sub-CPU 125. Upon receiving the detection signal including the detection position information, the sub-CPU 125 checks the value of the error flag recorded in the state storage section 126. If the value of the error flag is "0", the sub-CPU 125 determines whether or not the detection position information indicates a4 (S512).

If it is determined that the detection position information regarding the human body does not indicate a4 (NO in S512), the sub-CPU 125 repeats the processing in S512. On the other hand, if it is determined that the detection position information regarding the human body indicates a4 (YES in S512), the sub-CPU 125 transmits a control signal to the power management unit 114 so that the power management unit 114 supplies power to each component to cause the image forming apparatus 100 to recover from the sleep mode (S513).

Next, a case in which the image forming apparatus 100 is in the error state will be described.

First, if the image forming apparatus 100 is in the error state (YES in S502), the main CPU 102 changes the value of the error flag recorded in the state storage section 126 to "1" through the system bus 101 in S503. It is to be noted that the error flag indicates that the image forming apparatus 100 is in the error state when the value thereof is "1".

Next, processing in S504 is the same as that in S204 illustrated in FIG. 5, and accordingly description thereof is omitted. If the pyroelectric array sensor in the first detection section 124 detects a user, the first detection section 124 transmits a detection signal including detection position information to the sub-CPU 125. Upon receiving the detection signal including the detection position information from the first detection section 124, the sub-CPU 125 checks the value of the error flag recorded in the state storage section 126. If the value of the error flag is "1", the sub-CPU 125 determines whether or not the detection position information is approaching a4 (S505). The sub-CPU 125 continues to receive detection signals including detection position information from the first detection section 124 to track the movement of the detection position information, in order to determine whether or not a user in the detection range is approaching the position of the region a4, which is just in front of the operation unit 110. This determination process will be described with reference to FIG. 16.

In FIG. 16, arrows indicate the movement directions of the detection position of users. Route 1 indicates the route of a user who has been detected in order of d7 and d6. Route 2 indicates the route of a user who has been detected in order of g3 and f3. Route 3 indicates the route of a user who has been detected in order of a1 and a2.

For example, if detection position information received by the sub-CPU 125 indicates Route 1 or Route 2, a plurality of detection positions sequentially detected by the first detection section 124 indicate a user approaching a4. Therefore, the sub-CPU 125 determines that the user is approaching the position of the region a4 and it is expected that the user notices an error notification issued by the operation unit 110, and transmits a control signal to the power management unit 114 so that the power management unit 114 supplies power to each component. As a result, in this case, the image forming apparatus 100 recovers from the sleep mode. On the other hand, if the detection position information received by the sub-CPU 125 indicates Route 3, the sub-CPU 125 determines that the user is moving away from the position of the region a4 and it is not expected that the user notices an error notification issued by the operation unit 110, and does not transmit a control signal to the power management unit 114. Therefore, in this case, the image forming apparatus 100 remains in the sleep mode. By performing such control, the image forming apparatus 100 recovers from the sleep mode only when it is expected that the user notices an error notification issued by the operation unit 110, and therefore power is not consumed to recover from the sleep mode when it is not expected that the user notices an error notification issued by the operation unit 110.

If it is determined in S505 that the user in the detection range is not approaching the position of the region a4 (NO in S505), the sub-CPU 125 repeats S505. On the other hand, if it is determined that the user in the detection range is approaching the position of the region a4 (YES in S505), the sub-CPU 125 transmits a control signal to the power management unit 114 so that the power management unit 114 supplies power to each component in order to cause the image forming apparatus 100 to recover from the sleep mode (S506).

Next, processing in S507 and S508 is the same as that in S207 and S208, respectively, illustrated in FIG. 5, and accordingly description thereof is omitted. In S509, the main CPU 102 changes the value of the error flag recorded in the state storage section 126 to "0" through the system bus 101.

As described above, when the state of the image forming apparatus 100 including the human body detection unit 123 capable of detecting presence of a human body or the like in a plurality of regions is the error state, whether or not to recover from the sleep mode is determined on the basis of the movement of detection position information regarding a user. In doing so, the image forming apparatus 100 can recover from the sleep mode only when it is expected that the user notices an error notification issued by the operation unit 110. As a result, it is possible to avoid wasteful power consumption required to recover from the sleep mode when it is not expected that the user notices an error notification issued by the operation unit 110.

Here, when the state of the image forming apparatus 100 is the error state, recovery from the sleep mode is not performed if detection position information received by the sub-CPU 125 is moving away from the position of the region a4 (for example, Route 3). However, recovery from the sleep mode may be performed and error notification may be performed if the detection position information is approaching the position of the region a4, and, if the detection position information is moving away from the position of the region a4, recovery from the sleep mode need not be performed and error notification may be performed using a sound by supplying power to the speaker, which is not illustrated, instead.

In addition, in this embodiment, a configuration has been described in which the pyroelectric array sensor is used for the human body detection unit 123 of the image forming apparatus 100. However, the human presence sensor used for the human body detection unit 123 is not limited to the pyroelectric array sensor, and another type of human presence sensor capable of detecting presence of a human body or the like in a plurality of regions may be used, instead.

As described above, according to the image forming apparatus in the present invention, by making the condition of recovery from the sleep mode based on detection by a human presence sensor different between when the state of the image forming apparatus is normal and when the state of the image forming apparatus 100 is the error state, wasteful power consumption while there is no user around the image forming apparatus can be suppressed while notifying a nearby user of the error state, thereby prompting the user to remove the error state of the image forming apparatus. As a result, it becomes possible to realize both reduction of wasteful power consumed by, for example, keeping displaying the error state and suppression of loss in usability caused by a delay in recognition of the error state, as in a case in which a user does not recognize the error state of the image forming apparatus until the user used the image forming apparatus. Therefore, it is possible to provide a power-saving image forming environment whose usability is desirable.

In addition, a configuration has been described in which the condition of recovery from the sleep mode based on detection of a human presence sensor is different between when the state of the image forming apparatus is normal and when the image forming apparatus is in the error state. However, the factor in changing the condition of recovery from the sleep mode based on detection of a human presence sensor is not limited to presence or absence of the error state of the image forming apparatus, and the condition of recovery from the sleep mode based on detection of a human presence sensor may be different between when the state of the image forming apparatus is a certain state and when the state of the image forming apparatus is other than the certain state.

In addition, the number of factors in changing the condition of recovery from the sleep mode and the number of conditions of recovery from the sleep mode are not limited to two. For example, the condition of recovery from the sleep mode based on detection of a human presence sensor may be different between three or more states of the image forming apparatus. For example, when the image forming apparatus is in a particular error state (for example, a serious error state), the image forming apparatus recovers from the sleep mode and notifies a user of the error in accordance with detection of the user in the detection range 201 illustrated in FIG. 2, the detection range 1102 illustrated in FIG. 11, or any of Routes 1 to 3 illustrated in FIG. 16. In addition, when the image forming apparatus is in a minor error state, the image forming apparatus recovers from the sleep mode and notifies a user of the error in accordance with detection of the user in the detection range 201 illustrated in FIG. 2, the detection range 1102 illustrated in FIG. 11, or Route 1 or 2 illustrated in FIG. 16. In addition, when the image forming apparatus is normal, the image forming apparatus recovers from the sleep mode in accordance with detection of a user in the detection range 202 illustrated in FIG. 2 or the detection range 1101 illustrated in FIG. 11 or at the position a4. It is to be noted that the serious error state refers to an error that requires a service person, such as an error to be removed by replacing a component or a paper jam at a particular portion that is difficult for a user to remove, and the minor error refers to, for example, a typical paper jam, out of toner, paper out, or the like, but the types of errors are not limited to these.

It is to be noted that the configurations and the content of various pieces of data are not limited to those described above, and, needless to say, various configurations and types of content may be used in accordance with usage and purposes.

Although some embodiments have been described above, the present invention may be embodied, for example, as a system, an apparatus, a method, a program, a storage medium, or the like. More specifically, the present invention may be applied to a system including a plurality of apparatuses, or may be applied to an apparatus including a single device.

In addition, configurations obtained by combining the above-described embodiments are all included in the present invention.

Other Embodiments

In addition, the present invention is realized by executing the following process. That is, the present invention is realized by executing a process executed by supplying software (program) for realizing the functions of one of the above-described embodiments to a system or an apparatus through a network or one of various storage media and reading the program using a computer (or a CPU, a multiprocessor unit (MPU), or the like) of the system or the apparatus.

In addition, the present invention may be applied to a system including a plurality of apparatuses, or may be applied to an apparatus including a single device.

The present invention is not limited to the above-described embodiments. The present invention may be modified in various ways (include organic combinations of the above-described embodiments) on the basis of the spirit of the present invention, and such modifications shall not be excluded from the scope of the present invention. That is, configurations obtained by combining the above-described embodiments and modifications are all included in the present invention.

According to the present invention, it is possible to suppress wasteful power consumption while there is no user around the image forming apparatus while notifying a nearby user of an error state of the image forming apparatus, thereby prompting the user to remove the error state of the image forming apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-125440, filed Jun. 14, 2013, which is hereby incorporated by reference herein in its entirety.

What is claimed is:

1. An image forming apparatus comprising:
a detection unit configured to detect an object;
a display unit configured to display information indicating a state of the image forming apparatus;
an adjustment unit configured to adjust detection sensitivity of the detection unit in accordance with the state of the image forming apparatus; and
a power control unit configured to, if it is determined that the detection unit whose detection sensitivity has been adjusted by the adjustment unit has detected an object, perform control such that power is supplied to the display unit,
wherein, when the state of the image forming apparatus is a normal state, the adjustment unit adjusts the detection sensitivity of the detection unit such that an object existing in a first region can be detected and, when the state of the image forming apparatus is an error state, adjusts the detection sensitivity of the detection unit such that an object existing in a second region, which is larger than the first region, can be detected.

2. The image forming apparatus according to claim 1, wherein, when the state of the image forming apparatus is the normal state, the power control unit does not supply power to the display unit even if the detection unit detects an object existing in the second region.

3. The image apparatus according to claim 1,
wherein the error state refers to a state in which any of paper out, out of toner, and a paper jam has occurred.

4. A method for controlling an image forming apparatus, the method comprising:
   detecting an object using a detection unit;
   displaying information indicating a state of the image forming apparatus using a display unit;
   adjusting detection sensitivity of the detection unit in accordance with the state of the image forming apparatus; and
   performing control, if it is determined that the detection unit whose detection sensitivity has been adjusted has detected an object, such that power is supplied to the display unit,
   wherein, when the state of the image forming apparatus is a normal state, the adjustment unit adjusts the detection sensitivity of the detection unit such that an object existing in a first region can be detected and, when the state of the image forming apparatus is an error state, adjusts the detection sensitivity of the detection unit such that an object existing in a second region, which is larger than the first region, can be detected.

5. A non-transitory computer-readable storage medium in which a program is recorded, and when executed, the program causing a computer of an image forming apparatus to function as:
   a detection unit configured to detect an object;
   a display unit configured to display information indicating a state of the image forming apparatus;
   an adjustment unit configured to adjust detection sensitivity of the detection unit in accordance with the state of the image forming apparatus; and
   a power control unit configured to, if it is determined that the detection unit whose detection sensitivity has been adjusted by the adjustment unit has detected an object, perform control such that power is supplied to the display unit,
   wherein, when the state of the image forming apparatus is a normal state, the adjustment unit adjusts the detection sensitivity of the detection unit such that an object existing in a first region can be detected and, when the state of the image forming apparatus is an error state, adjusts the detection sensitivity of the detection unit such that an object existing in a second region, which is larger than the first region, can be detected.

* * * * *